United States Patent [19]
Heidemann et al.

[11] Patent Number: 5,453,872
[45] Date of Patent: Sep. 26, 1995

[54] FIBER-OPTIC AMPLIFIER AS WAVELENGTH CONVERTER

[75] Inventors: Rolf Heidemann, Tamm; Henning Bülow, Ludwigsburg; Thomas Pfeiffer, Stuttgart, all of Germany

[73] Assignee: Alcatel N.V., Rijswijk, Netherlands

[21] Appl. No.: 280,840

[22] Filed: Jul. 26, 1994

[30] Foreign Application Priority Data

Jul. 26, 1993 [DE] Germany ............ 43 24 984.1

[51] Int. Cl.$^6$ .................. H01S 3/106; H01S 3/0933; G01F 1/39
[52] U.S. Cl. .................. 359/341; 359/244; 372/71
[58] Field of Search .................. 359/134, 160, 359/174, 341, 244, 326; 385/1; 372/70, 71

[56] References Cited

U.S. PATENT DOCUMENTS

| | | | |
|---|---|---|---|
| 3,992,681 | 11/1976 | Haun et al. | 372/70 |
| 4,166,254 | 8/1979 | Bjorklund | 359/244 |
| 4,364,014 | 12/1982 | Grey | 372/8 |
| 4,382,660 | 5/1983 | Pratt et al. | 359/244 |
| 4,726,012 | 2/1988 | Amadieu et al. | 370/3 |
| 5,111,326 | 6/1992 | Ball | 359/244 |
| 5,111,333 | 5/1992 | Coles et al. | 359/244 |
| 5,229,876 | 7/1993 | Fatehi et al. | 359/160 |
| 5,247,529 | 9/1993 | Heidemann . | |
| 5,285,306 | 2/1994 | Heidemann | 359/160 |
| 5,291,326 | 3/1994 | Heidemann | 359/160 |
| 5,323,260 | 6/1994 | Alfano et al. | 359/341 |

FOREIGN PATENT DOCUMENTS

| | | |
|---|---|---|
| 0200613 | 12/1986 | European Pat. Off. . |
| 485813 | 5/1992 | European Pat. Off. . |
| 4109683 | 9/1992 | Germany . |

OTHER PUBLICATIONS

Wedding et al., "5 GBIT/S Transmission over 146 KM using Erbium–Doped Fibre Amplifier," ECOC '89, 15th European Conference on Optical Communication, Proceedings, vol. 1, 1989, Sweden, pp. 86–89.

Millar et al., "Efficient Up–Conversion Pumping at 800nm of an Erbium–Doped Flouride Fibre Laser Operating at 850nm," *Electronics Letters*, vol. 26, No. 22, Oct. 25, 1990, 1871–1873.

Miniscalco, "Erbium–Doped Glasses for Fiber Amplifiers at 1500nm," *Journal of Lightwave Technology*, vol. 9, No. 2, Feb. 1991, pp. 234–250.

*Primary Examiner*—Nelson Moskowitz
*Attorney, Agent, or Firm*—Spencer, Frank & Schneider; Christopher H. Lynt

[57] ABSTRACT

An optical system includes a fiber-optic amplifier having a section of optical waveguide doped with a rare-earth element and a pump-light source for emitting pump light, the fiber-optic amplifier receiving signal light of a first wavelength and outputting at least signal light of a second wavelength. An optical-to-electrical transducer receives the signal light of the second wavelength from the fiber-optic amplifier and produces an electrical output signal. The signal light of the second wavelength is pump light which is unabsorbed in the section of optical waveguide.

16 Claims, 2 Drawing Sheets

# FIBER-OPTIC AMPLIFIER AS WAVELENGTH CONVERTER

BACKGROUND OF THE INVENTION

1. Field of the Invention

The present invention relates to an optical system comprising a fiber-optic amplifier including a section of optical waveguide doped with a rare-earth element and a pump-light source emitting pump light, which converts signal light of a first wavelength which is to be transmitted to signal light of a second wavelength, and including an optical-to-electrical transducer for receiving the signal light of the second wavelength.

The invention also relates to the use of the fiber-optic amplifier.

2. Background Information

The term "optical system" as used herein means a combination of different optical devices, such as lasers and fiber-optic amplifiers, which interact and may be spaced far apart.

Fiber-optic amplifiers are commonly used to amplify the optical signal guided in an optical waveguide. Optical systems of the above kind are known. Hence, the use of the fiber-optic amplifiers contained therein is also known.

U.S. Pat No. 5,247,529 (corresponding to EP-A2-0514686) discloses an optical system which shows a further possible use of a fiber-optic amplifier (FIG. 4). The fiber-optic amplifier contained in that system is shown in its usual manner of representation, with a doped section of optical waveguide and a pump-light source. The doped section of optical waveguide is fed with modulated light having a wavelength of 850 nm from at least one transmit laser. It is also fed with unmodulated light, which can be amplified in the fiber-optic amplifier. This light has a wavelength of 1550 nm. The fiber-optic amplifier outputs modulated light with a wavelength of 1550 nm.

In that system, the wavelength of the light to be transmitted is fixed at 1550 nm, since at this wavelength the optical waveguides have an attenuation minimum. On the other hand, the use of light of this wavelength, which represents the optimum wavelength in terms of attenuation, involves increased complexity at the transmitting and receiving ends; specific transmit lasers and photodiodes have to be employed.

In the prior art system, the problem that specific transmit lasers have to be used is solved by employing, instead of an expensive laser which emits light at a wavelength of 1550 nm, a low-cost laser which emits light at a wavelength of 850 nm, and converting the signal light with a wavelength of 850 nm to signal light with a wavelength of 1550 nm.

No possibility of avoiding the use of expensive photodiodes suitable for receiving light with a wavelength of 1550 nm is indicated.

SUMMARY OF THE INVENTION

It is an object of the invention to provide a system in which the use of low-cost photodiodes, such as silicon diodes, is possible. This object is attained by an optical system including a fiber-optic amplifier having a section of optical waveguide doped with a rare-earth element and a pump-light source for emitting pump light, the fiber-optic amplifier receiving signal light of a first wavelength, and outputting at least signal light of a second wavelength; and an optical-to-electrical transducer for receiving the signal light of the second wavelength, from the fiber-optic amplifier and producing an electrical output signal; wherein the signal light of the second wavelength is pump light which is unabsorbed in the section of optical waveguide.

It is another object of the invention to show how a fiber-optic amplifier can be used as a wavelength converter. This object is attained by a method for converting input signal light of a first wavelength to output signal light of a second wavelength, utilizing the optical system according to the invention.

Further advantageous features of the invention are defined in the subclaims.

One advantage of the invention is that wavelength conversion is possible without the need for costly changes in the optical system. It is only necessary to use, at the receiving end, an optical-to-electrical transducer suitable for receiving another wavelength, which is less expensive than the optical-to-electrical transducer used in the prior art system. Another advantage of the invention is that wavelength conversion is possible even when the fiber-optic amplifier is in saturation. No steps need be taken to prevent overloading.

BRIEF DESCRIPTION OF THE DRAWINGS

The invention will now be explained in more detail with reference to the accompanying drawings, in which.

DETAILED DESCRIPTION OF THE PREFERRED EMBODIMENT

Figure 1:
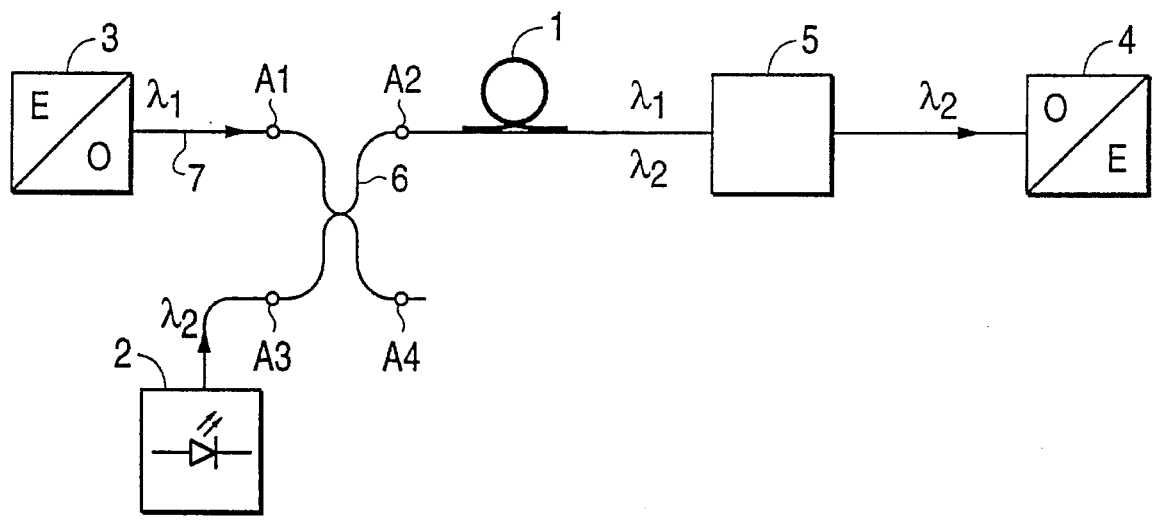
FIG. 1 shows a first embodiment of the novel system.

FIG. 1 shows a first embodiment of a simplified optical system with the components relevant to the invention. The system includes a transmit-side electrical-to-optical transducer 3, e.g., a laser, which emits signal light, i.e., modulated light of wavelength $\lambda$, and a receive-side optical-to-electrical transducer 4, which contains a photodiode. The system further includes a fiber-optic amplifier which consists essentially of a doped section of optical waveguide 1, a coupler 6, which is preferably wavelength-selective, and a pump-light source 2, which emits pump light at a wavelength $\lambda_2$. The coupler has four ports A1 to A4. The first port A1 of the coupler 6 is connected via an optical waveguide 7 to the electrical-to-optical transducer 3. The second port A2 of the coupler 6 is connected to the doped section of optical waveguide 1. The third port A3 of the coupler 6 is connected to the pump-light source 2. The fiber-optic link which interconnects the section of optical waveguide 1 and the receive-side optical-to-electrical transducer 4 contains an optical filter 5.

For simplicity, the term "light" will be used in the following for any optical radiation, even if it is invisible.

The section of optical waveguide 1 is doped with a rare-earth element, e.g., with erbiumions. The signal light of wavelength $\lambda_1$ emitted by the electrical-to-optical transducer 3 is fed via ports A1 and A2 of the coupler 6 into the doped section of optical waveguide 1. Via ports A3 and A2 of the coupler 6, the section of optical waveguide 1 is fed with pump light of wavelength $\lambda_2$. By this pump light, the erbium ions are raised from an energetic ground state into an excited, metastable state, from which they revert to the ground state through either spontaneous or stimulated emission. Stimulated emission is excited by signal light of wavelength $\lambda_1$ travelling through the section of optical waveguide 1. If the optical power of the signal light is high, a major part of the excited erbium ions will be triggered into stimulated emission; there will be more erbium ions in the ground state than if no or little signal light is fed in. In that case, the absorption of the pump light is strong and little pump light will emerge from the end of the section of optical waveguide 1. This pump light will hereinafter be referred to as "unabsorbed pump light".

The signal light and the pump light are fed into one end of the section of optical waveguide 1; accordingly, the pump light propagates in the section of optical waveguide 1 in the direction of the signal light.

Figure 2:
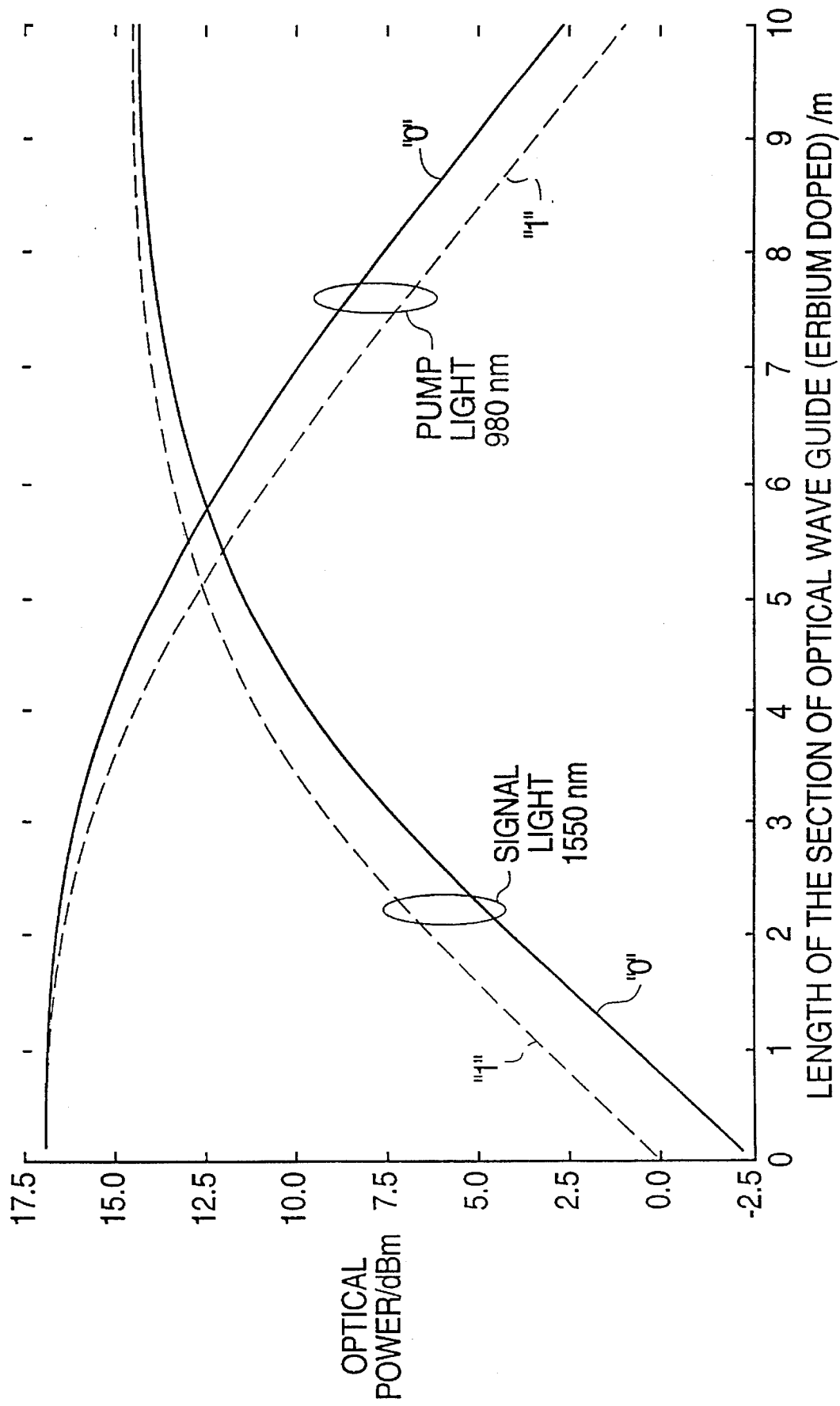
FIG. 2 is a plot of the powers of the pump light and signal light in the doped section of optical waveguide versus the length of the section of optical waveguide.

FIG. 2 is a plot which shows the dependence of the optical powers of the pump light and signal light in the section of optical waveguide on the length of the section of optical waveguide, which is doped with erbium ions.

The plot will be described with respect to an optical system which transmits a digital signal with the logic states 0 and 1. The description also applies for an analog signal, however.

The optical power of the signal light is shown for a logic 0 (continuous line) and for a logic 1 (dashed line). The optical power corresponding to a logic 1 is higher than that corresponding to a logic 0 throughout. Here the signal light has a wavelength of 1550 nm, and the pump light has a wavelength of 980 nm.

While exact wavelength values are given here, it is to be understood that spreads in these values are possible. These spreads may be due to manufacturing variations, for example.

It can be seen that the optical power of the signal light increases with increasing length, which is equivalent to amplification, until it reaches a maximum value, i.e., the amplifier enters into saturation. In this example, the optical power in the saturated condition is approximately 15 dBm, which is reached at a length of about 7 m.

Also shown is the variation of the optical power of the pump light, which is injected continuously, in the section of optical waveguide. The continuous line shows the variation when the signal light corresponds to a logic 0, and the dashed line shows the variation when the signal light corresponds to a logic 1.

The absorption of the pump light fed into the section of optical waveguide 1 is proportional to the number of erbium ions that are in the energetic ground state. The invention makes use of the fact that the absorption of the pump light depends, inter alia, on the optical power of the signal light. Increased signal-light power causes a greater number of erbium electrons to revert from the excited metastable state to the ground state through stimulated emission; thus, more pump light will be absorbed. Accordingly, a change in the optical power of the signal light will cause a change in the absorption of the pump light. As a result, the information contained in the signal light of wavelength $\lambda_1$ will be transferred to the unabsorbed pump light of wavelength $\lambda_2$. Even if the optical power of the signal light is so high that the amplifier enters saturation, the absorption of the pump light will change when the signal light changes between logic 0 and logic 1. Thus, no steps need be taken to limit the optical power of the signal light. Accordingly, signal light of wavelength $\lambda_1$ and unabsorbed pump light of wavelength $\lambda_2$ emerges from the section of optical waveguide 1. This unabsorbed pump light represents the signal light for the further transmission. Therefore, the optical-to-electrical transducer 4 at the receiving end must be designed to be sensitive to the wavelength $\lambda_2$. This can be achieved, for example, by using a low-cost silicon photodiode which is sensitive up to a wavelength of approximately 1100 nm. This silicon photodiode is insensitive to the likewise received wavelength $\lambda_1$, so that no special filter is required for this wavelength $\lambda_1$. If other photodiodes are employed, the signal light of wavelength $\lambda_1$ can be prevented from propagating by means of an optical filter 5. The signal light of wavelength $\lambda_1$ has a wavelengths, of, e.g., 1550 nm. The wavelength $\lambda_2$ of the pump light is 980 nm, for example. The wavelength of the pump light may also be 800 nm or 514 nm.

The section of optical waveguide 1 may also be doped with other ions. In that case, the amplifiable signal-light wavelength and the necessary pump-light wavelength $\lambda_2$ must be adapted to the dopant. An alternative to erbium is neodymium, for example. Then the wavelength $\lambda_1$ of the signal light fed into the fiber-optic amplifier is 1300 nm, and the wavelength of the pump light $\lambda_2$ is 850 nm.

It is also possible to use fluoride fibers doped with praseodymium. Then the wavelength $\lambda_1$ of the amplifiable signal light is also 1300 nm, and the wavelength $\lambda_2$ lies in the range of approximately 980 nm to approximately 1030 nm.

Figure 3:
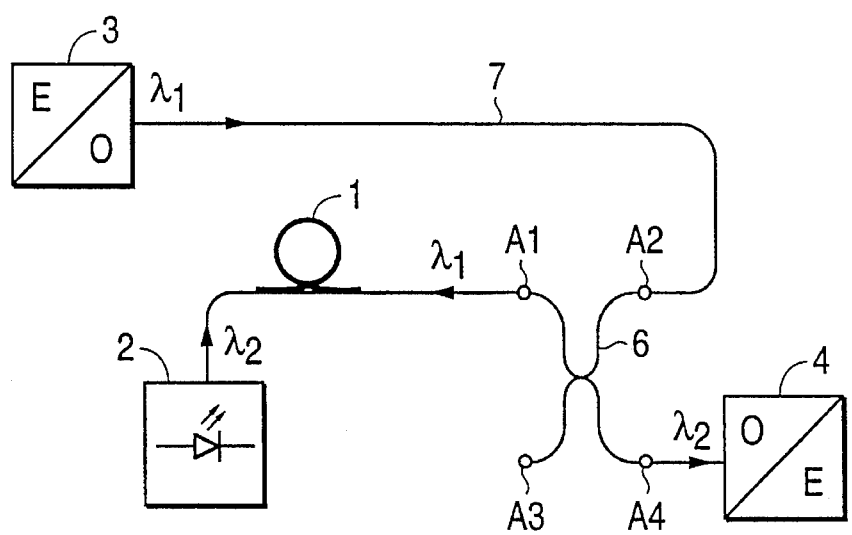
FIG. 3 shows a second embodiment of the novel system.

FIG. 3 shows a second embodiment of an optical system. Like reference characters are used to designate parts having the same function as in the system of FIG. 1. The parts are connected with one another in a different manner. One difference from the first embodiment is that the pump light and the signal light are not fed into the same end of the section of optical waveguide 1; accordingly, the pump light propagates in the section of optical waveguide 1 in a direction opposite to that of the signal light. The signal light is fed into one end of the section of optical waveguide 1 via the two ports A2, A1 of the coupler 6. The pump light is fed into the other end of the section of optical waveguide 1.

The optical-to-electrical transducer 4 is connected to the fourth port A4 of the coupler 6, where the unabsorbed pump light emerges. In this example, no optical filter 5 is required, since only unabsorbed pump light emerges from port A4 of the wavelength-selective coupler 6.

The absorption processes in the section of optical waveguide 1 correspond to those already explained above in connection with FIGS. 1 and 2.

In this optical system, the fiber-optic amplifier acts as a wavelength converter which converts signal light of a first wavelength $\lambda_1$, which is to be transmitted, to signal light of a second wavelength $\lambda_2$. Its characteristic property, i.e., amplification of a signal, is not used in this optical system. The signal light of wavelength $\lambda_1$ may also be any continuous control light.

In place of the optical-to-electrical transducer 4, after which an electric signal is further processed, a device can be used in which an optical signal is further processed or passed on. This device may also be located ahead of the optical-to-electrical transducer 4. It may be an integrated optical device, for example. It is also possible to use an optical device which converts the signal light of wavelength $\lambda_2$ to signal light of a third wavelength. Generally speaking, the optical device is designed to be sensitive to light of the second wavelength $\lambda_2$.

What is claimed is:

1. An optical system comprising:

a fiber-optic amplifier having a section of optical waveguide doped with a rare-earth element and a pump-light source for emitting pump light, the fiber-optic amplifier receiving signal light of a first wavelength and converting the signal light of the first wavelength to signal light of a second wavelength, outputting at least signal light of the second wavelength; and an optical-to-electrical transducer for receiving the signal light of the second wavelength from the fiber-optic amplifier and producing an electrical output signal;

wherein the signal light of the second wavelength is pump light which is unabsorbed in the section of optical waveguide.

2. An optical system as claimed in claim 1, further comprising an optical filter for filtering out signal light of the first wavelength from the output of the fiber-optic amplifier, and being disposed between the doped section of optical waveguide and the optical-to-electrical transducer.

3. An optical system as claimed in claim 1 wherein the section of optical waveguide is doped with erbium ions, wherein the first wavelength is approximately 1550 nm, and wherein the second wavelength is one of:
approximately 800 nm,
approximately 980 nm, or
approximately 514 nm.

4. An optical system as claimed in claim 1, wherein the section of optical waveguide is doped with neodymium ions, and wherein the first wavelength is approximately 1300 nm and the second wavelength is approximately 850 nm.

5. An optical system as claimed in claim 1, wherein the section of optical waveguide is doped with praseodymium ions, and wherein the first wavelength is approximately 1300 nm and the second wavelength lies in a wavelength range of approximately 980 nm to approximately 1030 nm.

6. A method for converting input signal light of a first wavelength to signal light of a second wavelength and producing an electrical output signal, comprising utilizing the optical system according to claim 1.

7. A method for converting input signal light of a first wavelength to signal light of a second wavelength and producing an electrical output signal, comprising utilizing the optical system according to claim 2.

8. A method for converting input signal light of a first wavelength to signal light of a second wavelength and producing an electrical output signal, comprising utilizing the optical system according to claim 3.

9. A method for converting input signal light of a first wavelength to signal light of a second wavelength and producing an electrical output signal, comprising utilizing the optical system according to claim 4.

10. A method for converting input signal light of a first wavelength to signal light of a second wavelength and producing an electrical output signal, comprising utilizing the optical system according to claim 5.

11. An optical system as claimed in claim 1, wherein the optical-to-electrical transducer comprises an optical device sensitive to the second wavelength.

12. The optical system according to claim 1, wherein the doped section of optical waveguide receives the signal light of the first wavelength at a first end thereof, and receives the pump light from the pump-light source at a second opposite end thereof, the signal light of the first wavelength and the pump light thereby propagating in opposite directions in the doped section of optical waveguide.

13. The optical system according to claim 1, further comprising coupling means for coupling the signal light of the first wavelength and the pump light from the pump-light source to a first end of the doped section of optical fiber.

14. The optical system according to claim 1, wherein the pump-light source is coupled to a first end of the doped section of optical fiber, and wherein the system further comprises coupling means for coupling a second opposite end of the doped section of optical fiber to the signal light of the first wavelength and to the optical-to-electrical transducer.

15. The optical system according to claim 1, wherein the signal light of the first wavelength carries digital information which is encoded in optical power variations thereof, and wherein the digital information encoded in the optical power variations of the signal light of the first wavelength is encoded with the fiber-optic amplifier in power variations of the signal light of the second wavelength output from the fiber-optic amplifier.

16. An optical system comprising:

an optical transmitter for producing signal light of a first wavelength and transmitting the signal light of the first wavelength over an optical transmission medium; and an optical receiver for receiving the signal light of the first wavelength from the optical transmitter over the transmission medium;

wherein the optical receiver includes wavelength conversion means for converting the signal light of a first wavelength to signal light of a second wavelength different from the first wavelength, comprising:

a section of optical waveguide doped with a rare-earth element;

a pump-light source, coupled to the doped section of optical waveguide, for emitting pump light of the second wavelength different from the first wavelength; and an optical-to-electrical transducer, coupled to the doped section of optical waveguide;

wherein the doped section of optical waveguide receives the signal light of the first wavelength and the pump light of the second wavelength, and outputs signal light of the second wavelength to the optical-to-electrical transducer, the signal light of the second wavelength being unabsorbed pump light.

* * * * *